Patented Jan. 25, 1949

2,460,255

UNITED STATES PATENT OFFICE 2,460,255

ALLYL ETHER OF ANACARDIC MATERIALS, BODIED PRODUCTS THEREOF, AND NOVEL COMPOSITIONS AND FRICTION ELEMENTS PRODUCED THEREWITH

Mortimer T. Harvey, South Orange, N. J., assignor to The Harvel Corporation, a corporation of New Jersey No Drawing. Application December 1, 1944, Serial No. 566,242

10 Claims. (Cl. 260—23)

This invention relates to novel compositions of matter. The invention also relates to novel products including one or more of said novel compositions of matter. In one of its more specific aspects the invention is directed to novel allyl ethers of anacardic material and/or the thickened products obtained by heating said ethers and also to novel compositions in which they are present as components and also to novel products embodying said compositions.

In my copending application Serial No. 541,850 filed June 23, 1944 which is now abandoned and of which this application is a continuation in part, I disclose allyl ethers of anacardic material and the thickened products obtained by heating said ethers and also methods for preparing the same. In this description, the term "anacardic material" designates any one of the following: cashew nut shell liquid, distillate from cashew nut shell liquid and residue from cashew nut shell liquid and also the polymers thereof.

The cashew nut shell liquid may be the raw cashew nut shell liquid obtained by the solvent extraction of said liquid from the cashew nuts or by the extraction of said liquid from said nuts by the use of a hot cashew nut shell liquid bath as set forth in the U. S. patent to Edward R. Hughes No. 2,058,456 of October 27, 1936, or it may be the so-called treated cashew nut shell liquid obtained after the raw cashew nut shell liquid has been treated to reduce its vesicant action and to remove the naturally occurring metals therein as set forth in the patent to Harvey-Damitz No. 2,128,247 of August 30, 1938 and to Harvey-Damitz No. 2,067,919 of January 19, 1937 to which reference is hereby made, or it may be either the raw or treated cashew nut shell liquid which has been steam distilled or distilled under vacuum at about 550° F.–600° F. to remove the more volatile constituents which measure about 5% by weight of the liquid treated.

The distillates and residues from cashew nut shell liquid may be obtained by distilling cashew nut shell liquid. The preferable manner of obtaining these products is to distill the cashew nut shell liquid at elevated temperatures. In commercial production, the cashew nut shell liquid may be either gas or vapor and for example steam distilled at between 600° F.–700° F. or distilled at 525° F.–700° F. under reduced pressure of about 50 mm. of mercury or at about 450° F. under reduced pressure of 10 mm. of mercury. By whatever method employed, the distillation is continued until the quantity by weight of the distillate is between about 25% to about 75% of the quantity by weight of the cashew nut shell liquid and the quantity by weight of the residue is between about 25% to about 75% of the quantity by weight of the cashew nut shell liquid. The distillate thus obtained for the most part consists of a phenol having an unsaturated hydrocarbon substituent having more than 13 carbon atoms and having a boiling point of approximately 225° C. at 10 mm. of mercury pressure.

The polymerized cashew nut shell liquid may be prepared by whatever method is desired but for purposes of illustration reference is hereby made to the Harvey-Damitz Patents No. 2,128,247 of August 30, 1938 and 2,240,038 of April 29, 1941. The distillate and the residue may be polymerized in any desired manner and for purposes of illustration reference is made to the patents to S. Caplan No. 2,292,611 of August 11, 1942 and 2,317,585 of April 27, 1943.

These ethers may be produced by reacting an allyl compound with one or a combination of two or more of said anacardic materials. The reaction may be carried out at atmospheric or superatmospheric pressure. The allyl compounds which I prefer to employ are the allyl esters such as allyl chloride, allyl bromide, allyl iodide, allyl sulfate, etc. Of the allyl esters now on the market, I prefer to employ the allyl chloride because of its relatively low cost and normal availability. The reaction of the allyl esters with the anacardic material may be easily and readily carried out by heating a mixture of an anacardic material, an allyl ester and an alkali. The reaction may be carried out under aqueous or non-aqueous conditions. This mixture is preferably heated under a reflux condenser for a period of time, then it is neutralized with an acid. The water and salt are removed from the allyl ether of the anacardic material therein. In some cases a solvent, inert to the reactants, may be employed in the reaction mixture. The use of such a solvent is particularly useful in those cases where the consistency of the anacardic material is so heavy that it is difficult to obtain a fairly uniform mixture of reactants and to inhibit emulsification.

The allyl ethers of anacardic materials may be thickened or polymerized by the application of heat and this action may be promoted by adding thereto a peroxide such as benzoyl peroxide, sodium peroxide, tertiary butyl hydro-peroxide, lauryl peroxide and the like.

While these ethers of said anacardic materials are not reactive to any material degree with aldehydes, such as formaldehyde, paraformaldehyde, furfuraldehyde, acrolein, polymerized acrolein, or the like, or with a compound such as hexamethylene tetramine capable of yielding an aldehyde, I have discovered that the thickened products obtained by heating said allyl ethers of said anacardic materials are reactive with any one or a combination of two or more of said aldehydes. The temperature which I prefer to employ in carrying out this reaction is preferably between 175° F. and 250° F., and I have found that these reaction products are considerably harder than the solid products obtained by converting said ethers to the solid state by the application of heat.

The thickened products of said anacardic materials which I prefer to employ in carrying out this invention and particularly in said reaction are those which are fusible thermosetting resins whose viscosities are above about 5,000 centipoises at 25° C. and may be even as high as 100,000 depending upon the starting anacardic material; when the thickened products produced by heating allyl ether of cashew nut shell liquid or said distillate are so employed, I prefer to use those having viscosities between about 5,000 to 20,000 centipoises at 25° C.; but when the thickened products produced by heating allyl ethers of the residue or the various polymers mentioned herein, the viscosity may be as high as and in some cases above 100,000 centipoises at 25° C.

The quantity of aldehyde to said heat thickened product may be between about ¼ mole to 2 moles of aldehyde to each 350 parts by weight of said thickened product and moreover the reaction may be carried out under acidic or alkaline conditions and preferably at temperatures above room temperature and above about 175° F. and between about 200° F. and 250° F.

Examples A to D are illustrative examples of methods for making these ethers:

Example A 300 grams of cashew nut shell liquid
100 grams of allyl chloride
53 grams of sodium hydroxide dissolved in 150 grams of water.

The aqueous solution of sodium hydroxide was added to the cashew nut shell liquid and this mixture was stirred to provide a homogeneous mass. The allyl chloride was then added slowly with stirring and the mixture was heated under a reflux condenser. This mixture is maintained in the state of boiling for about 3 hours. Then the resultant mass is neutralized and allowed to stand whereupon the mass separates into a water layer and an oily layer. The oily layer may then be heated under a vacuum to dehydrate the same. This oily layer which for the most part is the allyl ether of cashew nut shell liquid did not react to any material degree with hexamethylene tetramine when a mixture thereof in the ratio of 10 parts of the former to 1 of the latter was kept in an oven at 100° C. for 16 hours.

Example B 300 grams of distillate from cashew nut shell liquid (boiling point approx. 225° C. at 10 mm. of mercury pressure)
100 grams of allyl chloride
53 grams of sodium hydroxide in 150 grams of water.

The caustic and water are dissolved together first and added to a mixture of said distillate and allyl chloride. The caustic-water solution is added very slowly through the top of a reflux condenser. After all the caustic has been added, the reaction is continued by boiling for at least two hours. Then the mass is neutralized and allowed to stand whereupon an oily layer rises to the top and the salt and water solution is at the bottom. This mixture may be placed in a separatory funnel and the water solution removed from the bottom and the upper oily layer is washed with hot water two times. The oily layer which is chiefly the allyl ether of said distillate may then be dehydrated in an open kettle by heating to approximately 130° C. The specific gravity of the product is .932 at 25° C. and the index of refraction 1.508 at 25° C.

Example C 200 grams of polymerized cashew nut shell liquid having a viscosity of 60,000 centipoises at 25° C.
200 grams of xylol
100 grams of allyl chloride are mixed together to make a clear solution. To this is added through a reflux condenser an alkaline solution of 55 grams of NaOH in 200 grams of water. The addition of the alkali is accomplished slowly and with stirring between each addition. The mixture is then heated to boiling for two hours, then neutralized with dilute mineral acid. The resultant product contains the allyl ether of polymerized cashew nut shell liquid.

Example D 200 grams of the residue from cashew nut shell liquid
400 grams of xylol
100 grams of allyl chloride are mixed together to make a clear solution. To this is added through a reflux condenser an alkaline solution of 55 grams of NaOH in 200 grams of water. The addition of the alkali is accomplished slowly and with stirring between each addition. The mixture is then heated to boiling for two hours, then neutralized with dilute mineral acid, washed thoroughly with water and dehydrated to remove moisture and neutral solvent. The resultant viscous liquid, is chiefly the allyl ether of cashew nut shell liquid residue.

Friction materials, suitable for brake linings, clutch facings or the like, that are extensively used, ordinarily comprise heat resistant fibers, such as asbestos fibers and material for binding the fibers and for modifying the friction thereof. The asbestos fibers may be in any desired form and generally are in woven, matted or felted form. According to this invention the heat resistant fibers are associated with certain materials to provide novel combinations especially suitable for brake linings, clutch facings and the like.

The asbestos fibers may be associated with allyl ethers of anacardic material, with the thickened products obtained by heating the allyl ethers of anacardic material, with the reaction products of an aldehyde having a reactive methylene group such as formaldehyde, paraformaldehyde, acetaldehyde, glyoxal, trioxymethylene, furfuraldehyde, acrolein, polymerized acrolein, or the like and the thickened products obtained by heating the allyl ethers of anacardic material instead of employing one of said aldehydes, a compound such as hexamethylene tetramine which is capable of yielding one of said aldehydes may be employed. Said thickened products are fusible and have a viscosity above about 5,000 centipoises at 25° C. Any of the aforementioned products may be combined with said asbestos fibers and are cured preferably by heating to the substantially dry and solid state to provide improved friction elements. If desired, in addition thereto, there may also be associated with said asbestos fibers one or more of the following: (a) resins, such as the well known oil soluble phenol-aldehyde resins which in their fusible state are soluble in heat polymerizable oils and examples of which are the resinous condensation reaction products of an aldehyde such as formaldehyde with a phenol such as para tertiary butyl phenol, para tertiary amyl phenol, the two para tertiary hexyl phenols, para phenyl phenol, carvacrol, xylenols, para cresol, mixtures of para cresol with ortho cresol and meta cresol and commercial phenols and mixtures of phenols which upon condensation with a reactive methylene group give oil soluble condensation products, cashew nut shell liquid, marking nut shell liquid, Japanese lac, and their several characteristic phenolic components and derivatives such as anacardic acid, cardol, anacardol, urushiol, cardanol and other similar phenols found in or derived from the plants of the Anacardiaceae family, and phenols generally which have unsaturated hydrocarbon side chains and which, with a reactive methylene group, give condensation products soluble in or dispersible with fatty oils and curable therewith by heating to a dry, oil resistant form; (b) heat polymerizable and drying oils, such as chinawood oil, oiticica, perilla oil, soya bean oil, linseed oil, or the like; (c) rubber materials such as natural or reclaimed rubber, the so-called "synthetic rubbers" known as "Neoprene," "Buna-N," and "Buna-S" and respectively being essentially the rubbery polymers of 2-chlor-butadiene, rubbery copolymers of butadiene and acrylonitrile and the rubbery copolymers of butadiene and styrene; (d) normally solid polyvinyl acetals such as polyvinyl butyral, polyvinyl formal; (e) ethyl cellulose; (f) sulphur; (g) barytes; (h) carbon black and the like. Said aforementioned products with or without said additions may be employed with asbestos fibers either as binders and friction augmenting materials or only as friction augmenting materials, preferably in comminuted form and carried by the binder of said fibers to provide novel and improved brake linings.

The following are examples illustrating the invention and are not to be construed by way of limitation.

*Example 1*

A length of woven or pressed, felted or matted asbestos of the desired dimensions and of the type commonly employed in the production of brake linings is first de-aerated and dehydrated and then soaked in a bath of an allyl ether of an anacardic material to coat and/or impregnate the fibers thereof. This may be accomplished by placing a length of said material in a chamber which is heated and maintained under vacuum, then into said chamber is added an allyl ether of cashew nut shell liquid which is maintained therein under pressure of about 100 lbs. per square inch and at a temperature of about 75° F.–200° F. The viscosity of said ether is preferably low and may be between about 200 to 600 centipoises at 25° C. Then after about 1 to 2 hours of soaking the excess ether is removed and the ether soaked asbestos material is allowed to drain overnight. Subsequently it is cured for about 24 hours in a temperature graduated oven starting at about 150° F. and reaching about 350° F. in that time. Upon removal from the oven and allowed to cool to room temperature, this cured, coated and/or impregnated material will be found to be substantially dry, may be readily cut into the desired lengths and is sufficiently flexible to be formed around a brake drum and provides an improved brake lining. Said allyl ether will be found to have been converted to a substantially dry, infusible and solid resinous composition having good frictional properties.

If desired, said soaking bath may be made thinner by the addition of a solvent such as a petroleum solvent such as "Varnolene" thereto. When a solvent is employed, the soaked material after draining is preferably subjected to a heating operation to remove the solvent therefrom before curing. Instead of using allyl ether of cashew nut shell liquid in said bath, we may use a heat thickened product of allyl ether of cashew nut shell liquid and when the latter is employed, I prefer that it be in solution with a solvent such as "Varnolene." If desired, one or more of the aforementioned aldehydes may be distributed or dissolved in said solution. Whatever type of soaking bath is employed, there may also be included therein a quantity of an oil soluble heat reactive phenol-aldehyde resin, and preferably thermosetting heat reactive substituted phenolformaldehyde resin and the quantity by weight of said resin added thereto may be between about 10% to 80% based on the quantity by weight of said ether or thickened product of said ether therein. The use of said phenol-aldehyde resin therein imparts increased hardness to the resultant cured brake lining. To impart increased softness, there may be employed the same quantity of one of said heat polymerizable and drying oils in place of said phenol-aldehyde resin.

Instead of omitting all of the phenol-aldehyde resin, said bath may contain both said oils and said resin. In this case there may be prepared a solution of one of said phenol-aldehyde resins in said oil, with the ratio of the quantity of said resin in said oil being between about 25 to 100 and 75 to 25. The solution may be obtained by heating a mixture of said resin and said oil at a temperature of approximately 150° F. until solution is completed. The ratio of the amount of said resin-oil solution in said bath to the quantity of the ether and/or thickened products obtained by heating said ethers may be between about 25 to 100 and 75 to 25. Also included in any one of said baths and with or without said phenol-aldehyde resins and/or said oils and/or said aldehydes may be a quantity of a normally solid polyvinyl acetal, such as polyvinyl butyral, polyvinyl formal or the like, with the ratio by weight of the quantity of ether and/or the thickened products produced by heating said ethers to the quantity of the polyvinyl acetal being between about 1 to 100 and 12 to 100.

If desired, there may also be included in said bath a quantity of various other materials heretofore mentioned. In any of the combinations of materials as set forth, the final product after curing at the aforementioned curing temperatures results in an improved brake lining of asbestos fibers and a binder which is a substantially dry, solid, infusible resinous composition having good frictional properties.

Example 2

Instead of employing a length of said asbestos material to be impregnated and/or coated with said materials as set forth in Example 1, a batch of asbestos fibers may be added directly thereto, mixed therewith, shaped and cured.

- 100 parts of allyl ether of anacardic material and preferably of cashew nut shell liquid or preferably of a heat thickened product thereof having a viscosity between about 5,000 to 20,000 centipoises at 25° C.
- 100 parts of a solvent for said ether or the heat thickened product thereof, such as petroleum spirits known as "Varnolene."
- 8 parts of one of said aldehydes—preferably hexamethylene tetramine (a compound capable of yielding one of said aldehydes)

These ingredients are placed in a mixer of the dough or cake mixer type and subjected to a mixing operation until there is a solution or substantially uniform distribution of these components with respect to each other. Then to said mass is added 200 parts of asbestos fiber together with additional "Varnolene" of such quantity that mixing may be done with comparative ease. Any of the other ingredients set forth in Example 1 may be added thereto and preferably in the proportions indicated therein and mixed therewith to provide a substantially uniform mix. After complete mixing the mass is removed from the mixer, the solvent is evaporated therefrom at temperatures of about 120° F. to about 140° F. and then is rolled or extruded into ribbons of the proper thickness and width and these ribbons are cured in temperature graduated ovens between about 150° F. to 400° F. for a period of about 25 hours. After curing, these ribbons may be cut and ground to the desired dimensions to provide brake linings having matted asbestos fibers with a binder therefor which has good frictional properties and which is substantially dry, solid and infusible composition.

100 parts of rubber may be milled on a rubber mill and in the course of said milling there may be added thereto between 10 to 200 parts of a product having a viscosity between 5,000 and 20,000 centipoises at 25° C. and obtained by heating the allyl ether of cashew nut shell liquid. The milling is continued until there is a substantially uniform distribution of said thickened product into said rubber. Then this milled product may be cut in small pieces and placed in a swelling agent such as "Varnolene." After standing for about from 1 to 3 days in said "Varnolene" a fluid gelatinous mass is obtained. This mass may then be mixed with asbestos, sulphur and the usual rubber accelerators in the proportion of about 3 parts of asbestos to 1 of said solids in said mass. The swelling agent is then removed from said mixture by subjecting the same to a temperature of about 125° F.–150° F. and the resulting product is sheeted and formed into the desired shape, then cured in low pressure molds for approximately 1 hour and further heated in a graduated oven ranging from 150° F.–400° F. over a 24 hour period.

Instead of natural rubber, so-called "Buna-S" or "Buna-N" may be employed and when either of these is employed, xylol, for example, is used as the swelling agent. In any case, the resultant cured product includes a binder for the asbestos fibers which binder is a substantially dry infusible solid mass.

Example 3

Instead of employing said materials as binders and frictional materials with asbestos for brake linings, said materials may be prepared in the form of comminuted materials and then incorporated in a binder for said asbestos and are retained in said binder as discrete particles. The binder employed may be any of those known to the art such as rubber, phenol-aldehyde resins, heat polymerized drying oils and the like or combinations of these or other materials heretofore used for this purpose.

A quantity of an allyl ether of cashew nut shell liquid may be heated between about 500° F. to 600° F. until just before solidification. Then it is poured into shallow pans and cured for 24 hours at about 300° F. to 400° F. After that period it will have been converted to the substantially dry, solid and infusible state and is a rubbery mass. This rubbery mass is then comminuted in any convenient manner, by using for example, differential rolls or a hammer mill. The mass is comminuted so that there is provided a relatively fine dust whose particle size is below about 20 mesh per square inch. This friction augmenting dust may be combined with the asbestos and binder therefor in the manner heretofore employed for the incorporation of dusts as components of a brake lining. The usual manner is to incorporate in a brake lining of asbestos fibers, 8 to 20% of dust based on the weight of the finished product, about double that amount of a binder, together with barytes, carbon black and other materials which may be used therewith.

Instead of using only the allyl ethers of an anacardic material to make said friction augmenting dusts, said ethers as well as the heat thickened products thereof may be modified in the same manner as they were in Examples 1 and 2 and the following are specific illustrations of some of said modifications.

Example 4

100 parts of allyl ether of cashew nut shell liquid is heated between about 500° F. to 600° F. until its viscosity has increased to between about 5,000 to 20,000 centipoises at 25° C. Then this thickened product is cooled to room temperature and then mixed with about 8 parts of paraformaldehyde and about 5 parts of diethyl sulphate until a substantially uniform mixture is obtained. This mix is placed in shallow pans in an oven at 250° F. to 300° F. for 24 hours and the resulting product is a substantially dry, solid, tough, infusible mass which is then comminuted to a relatively fine dust e. g. 20 mesh per square inch and may be incorporated in a brake lining in the manner heretofore set forth.

Example 5

100 parts of the allyl ether of cashew nut shell liquid is heated to between 500° F.–600° F. until its viscosity has increased to between about 5,000 to 20,000 centipoises at 25° C. Then this thickened product is mixed with a solution consisting of a ratio of 1 part of a fusible thermosetting tertiary butyl phenol-formaldehyde resin and 4 parts of linseed oil. The quantity of said solution employed is preferably about 50 to 100 parts. Also added to said mixture may be a quantity of sulphur and preferably 2 to 20 parts. These components are mixed with each other until a substantially uniform mixture is obtained. The mass is then placed in shallow pans in an oven at about 250–300° F. for 24 hours and the resultant product is a substantially solid dry infusible mass which is then comminuted to a relatively fine dust e. g. 20 mesh per square inch and may then be incorporated into a brake lining in a manner heretofore set forth.

Having thus described my invention, what I claim and desire to protect by Letters Patent is:

1. Allyl ether of a liquid anacardic material selected from the group consisting of cashew nut shell liquid and its polymers, distillates of cashew nut shell liquid and their polymers, said distillates having a boiling point of approximately 225° C. at 10 mm. of mercury pressure, residues of cashew nut shell liquid obtained by heating cashew nut shell liquid until the quantity by weight of the residue is between 25% to 75% by weight of the cashew nut shell liquid and the polymers of said residues.

2. Allyl ether of cashew nut shell liquid.

3. Allyl ether of liquid polymerized cashew nut shell liquid.

4. Allyl ether of a distillate of cashew nut shell liquid, said distillate having a boiling point of approximately 225° C. at 10 mm. of mercury pressure.

5. A thickened product obtained by heating allyl ether of a liquid anacardic material selected from the group consisting of cashew nut shell liquid and its polymers, distillates of cashew nut shell liquid and their polymers, said distillates having a boiling point of approximately 225° C. at 10 mm. of mercury pressure, residues of cashew nut shell liquid obtained by heating cashew nut shell liquid until the quantity by weight of the residue is between 25% to 75% by weight of the cashew nut shell liquid and the polymers of said residues.

6. A substantially solid product obtained by heating allyl ether of a liquid anacardic material selected from the group consisting of cashew nut shell liquid and its polymers, distillates of cashew nut shell liquid and their polymers, said distillates having a boiling point of approximately 225° C. at 10 mm. of mercury pressure, residues of cashew nut shell liquid obtained by heating cashew nut shell liquid until the quantity by weight of the residue is between 25% to 75% by weight of the cashew nut shell liquid and the polymers of said residues.

7. A friction element comprising asbestos and a substantially solid product produced by heating a combination comprising a heat polymerizable fatty drying oil, and allyl ether of a liquid anacardic material selected from the group consisting of cashew nut shell liquid and its polymers, distillates of cashew nut shell liquid and their polymers, said distillates having a boiling point of approximately 225° C. at 10 mm. of mercury pressure, residues of cashew nut shell liquid obtained by heating cashew nut shell liquid until the quantity by weight of the residue is between 25% to 75% by weight of the cashew nut shell liquid and the polymers of said residues.

8. A friction element comprising asbestos and a substantially solid product produced by heating a combination comprising an oil soluble heat reactive phenol-aldehyde resin and allyl ether of a liquid anacardic material selected from the group consisting of cashew nut shell liquid and its polymers, distillates of cashew nut shell liquid and their polymers, said distillates having a boiling point of approximately 225° C. at 10 mm. of mercury pressure, residues of cashew nut shell liquid obtained by heating cashew nut shell liquid until the quantity by weight of the residue is between 25% to 75% by weight of the cashew nut shell liquid and the polymers of said residues.

9. A friction element comprising asbestos and a substantially solid product produced by heating a combination comprising an oil soluble heat reactive phenol-aldehyde resin, a heat polymerizable drying fatty oil and allyl ether of liquid anacardic material selected from the group consisting of cashew nut shell liquid and its polymers, distillates of cashew nut shell liquid and their polymers, said distillates having a boiling point of approximately 225° C. at 10 mm. of mercury pressure, residues of cashew nut shell liquid obtained by heating cashew nut shell liquid until the quantity by weight of the residue is between 25% to 75% by weight of the cashew nut shell liquid and the polymers of said residues.

10. A friction element comprising asbestos and a substantially solid product obtained by heating a product defined in claim 5.

MORTIMER T. HARVEY.

REFERENCES CITED

The following references are of record in the file of this patent:

UNITED STATES PATENTS

| Number | Name | Date |
|---|---|---|
| 2,165,140 | Harvey | July 4, 1939 |